Aug. 23, 1932.  J. A. BALL  1,873,258
ACHROMATIC OPTICAL SYSTEM AND METHOD
Filed Aug. 15, 1929
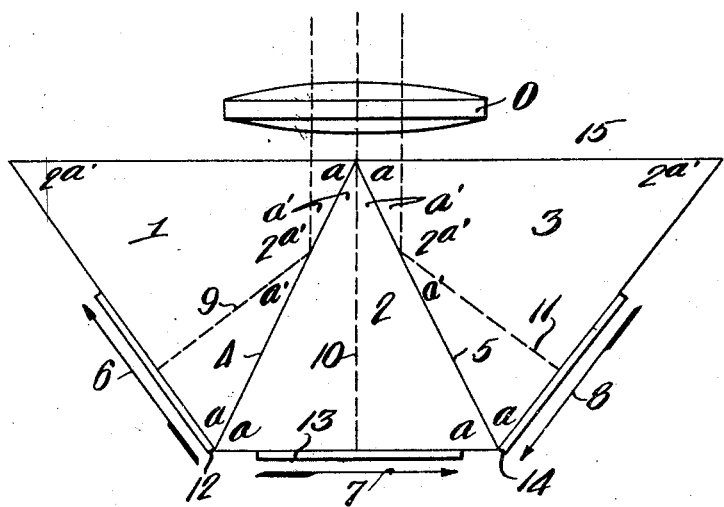

Patented Aug. 23, 1932

1,873,258

UNITED STATES PATENT OFFICE

JOSEPH A. BALL, OF LOS ANGELES, CALIFORNIA, ASSIGNOR, BY MESNE ASSIGNMENTS, TO TECHNICOLOR, INC., OF NEW YORK, N. Y., A CORPORATION OF DELAWARE

ACHROMATIC OPTICAL SYSTEM AND METHOD

Application filed August 15, 1929. Serial No. 386,089.

This invention relates to achromatic optical systems, and more particularly to systems adapted for use in color photography involving three (or more) different color aspects of the same scene. As is well-known, the effects of chromatic aberration are particularly objectionable in three-color photography and apochromatic lenses have been deemed essential for the purpose (see page 489 of the second edition of Mirrors, Prisms and Lenses, by James P. C. Southall). However, the manufacture of such lenses is extremely difficult, involving the use of three or more kinds of glass in a single element, etc., and their design imposes restraints in other directions to such a degree that they can be used only at relatively small apertures, which is unsatisfactory in the art of cinematography, particularly color cinematography.

Objects of the present invention are to produce an optical system especially adapted for three-color photography, which substantially eliminates noticeable effects of chromatic aberration and which at the same time eliminates the necessity of apochromatism.

This invention is based upon the principle that if a camera for making three or more color records be provided with a lens which is achromatic with respect to the two colors of longer wave length, the resultant multi-color picture will be free from objectionable effects of chromatic aberration even though the light component or components of shorter wave length be substantially affected by chromatic aberration. Thus, in three-color photography, using red, green and blue light components for the respective exposures, by making the lens achromatic with respect to the red and green components, the resultant three-color picture has satisfactory achromatism for most purposes, including average cinematographic requirements, even though the record formed with the blue component is substantially affected by chromatic aberration. Indeed a considerable lack of registration in the blue record is not serious. That one record may be substantially affected by chromatic aberration without noticeably affecting the three-color composite is due to the fact that the positive record exposed with blue light, which is colored yellow, contributes little or nothing to the definition of the composite picture.

Since methods of correcting lenses for chromatic aberration are well-known, and since there are innumerable lens designs to which this invention may be applied, it is not only unnecessary to describe the various applications but such description would uselessly encumber this disclosure, the invention consisting broadly in an optical system in which the lens elements (including prisms if used in such manner as to produce a lens effect as disclosed, for example, in Reissue Patent No. 14,983) are achromatic with respect to the colors transmitted by the filters chosen for the two light components of longer wave length, such as red and green in three-color processes, and in forming three or more different color records in which the effect of chromatic aberration is confined chiefly to the record or records exposed with the light components of shorter wave length. Likewise, the many camera arrangements for dividing the light into component parts and for shuttering the light while advancing cinematographic film form no part of the present invention. However, in producing motion pictures, the light for exposing the respective records should be collected along the same optical axis, that is, from the same point of view, and the records, particularly the red and green records, should be exposed simultaneously or at least concomitantly.

The optical system shown in the figure (which is claimed in Serial No. 351,885) comprises an objective O and a prism unit formed of three prisms 1, 2 and 3 cemented together with partial reflecting surfaces 4 and 5 therebetween. There are various known ways of forming the reflecting surfaces but they are preferably formed by spattering a thin deposit of silver or gold on one of the abutting surfaces of the prisms before they are cemented together, the thickness of the deposit depending upon the desired ratio of transmission to reflection. The shape of the prisms may be varied more or less, but they are preferably shaped approximately as shown in the figure where corresponding angles are correspondingly designated, $a$ and $a'$ being complementary and $2a$ and $2a'$ being twice the magnitude of $a$ and $a'$ respectively. Obviously the three images 6, 7 and 8 are formed by light transmitted along paths 9, 10 and 11 respectively, the images 6 and 8 being reversed with respect to image 7 because the component beams traversing paths 9 and 11 are reflected whereas the central component is transmitted without reflection. The transmission-reflection ratio of the partial reflectors 4 and 5 may be adjusted so that the light components passing to the respective focal planes are approximately equal or differ in any desired degree. The filters 12, 13 and 14 may be cemented to the emergent faces of the corresponding prisms or otherwise mounted in the paths of the component beams. While the differently colored filters may be distributed among the three locations as desired, if one of the three component beams is weaker than the other two the filter for the blue record is preferably located in the path of the weaker beam.

Throughout the specification and claims all references to red, green, blue, etc., are to be understood to refer to colors or hues in which these particular colors are largely involved, that is ranges of shades in the regions of these colors, such as red-orange, blue-green, blue-violet, etc., and not necessarily pure colors; also that the particular ranges of wave lengths chosen for any particular use depends upon the judgment of the designer and that the invention is not limited to any particular ranges of waves lengths. However, for the purpose of illustration, typical examples of colors which have been found particularly suitable for cinematographic pictures are those transmitted by Wratten filters No. 25, No. 58 and No. 49 for red, green and blue ranges, respectively.

I claim:—

1. The method of producing motion-pictures in colors which comprises recurrently exposing different film areas to red, green and blue color components of light reflected from the same scene along the same optical axis, and conjointly focusing the components with lens elements which are achromatic with respect to the colors represented by the red and green components, whereby the effect of chromatic aberration is substantially confined to the blue component of shorter wave length.

2. An optical system comprising means for making three like exposures to the red, green and blue aspects of the same object-field, including lens elements which are achromatic with respect to red and green but which produce an uncorrected residual dispersion in the blue range, and means for concurrently making the red and green exposures through said elements.

Signed by me at Los Angeles, California this 22nd day of July 1929.

JOSEPH A. BALL.